Sept. 5, 1950          F. R. MARINDIN          2,520,945
WAVE TRANSMISSION APPARATUS
Filed Aug. 18, 1943          3 Sheets-Sheet 1
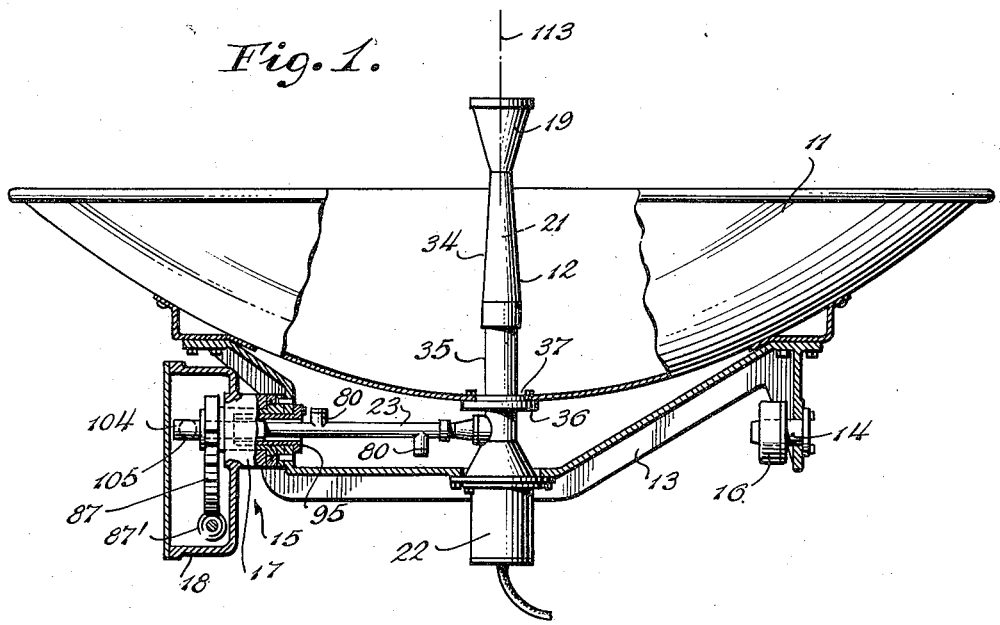
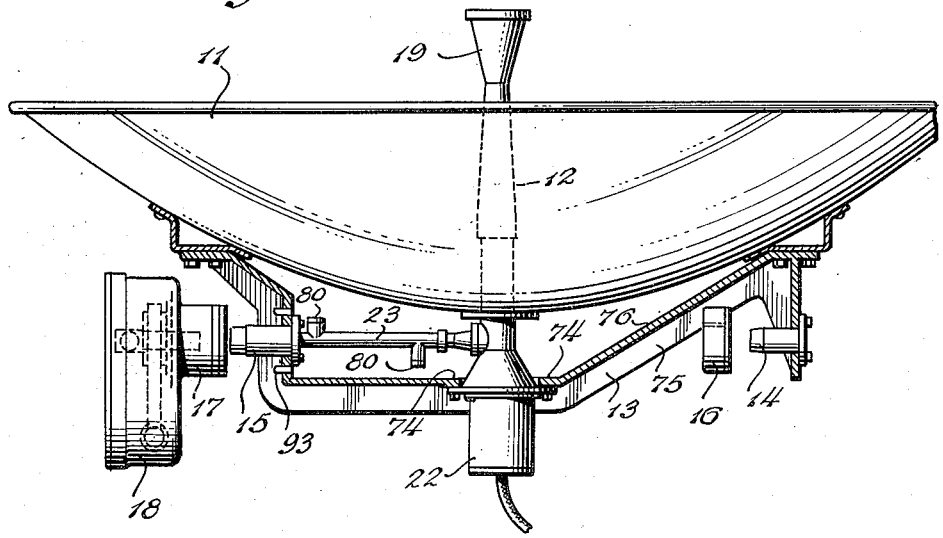
INVENTOR
FREDERICK R. MARINDIN
BY
ATTORNEY

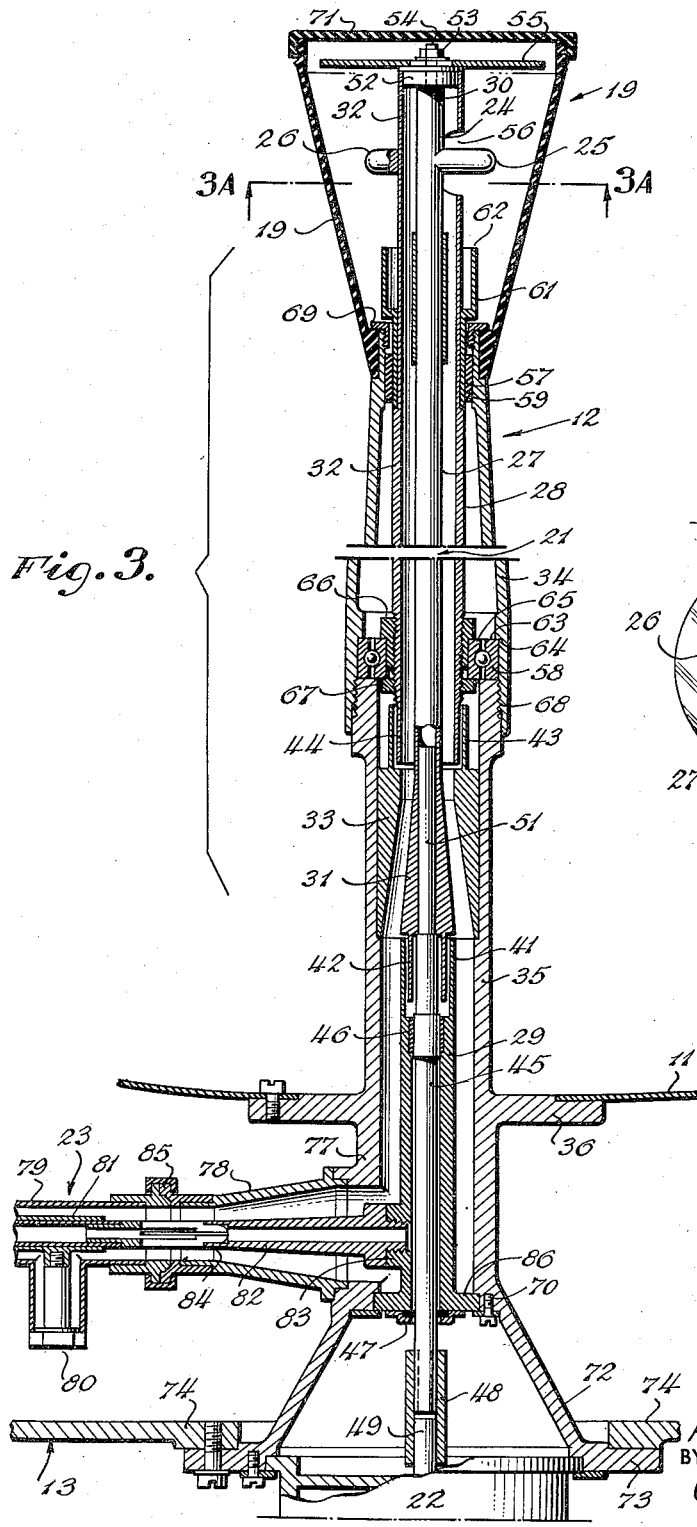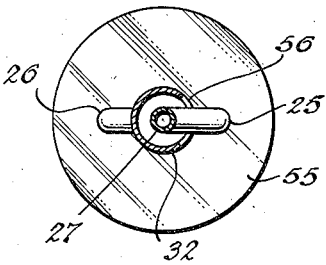

Sept. 5, 1950     F. R. MARINDIN     2,520,945
WAVE TRANSMISSION APPARATUS
Filed Aug. 18, 1943     3 Sheets-Sheet 3
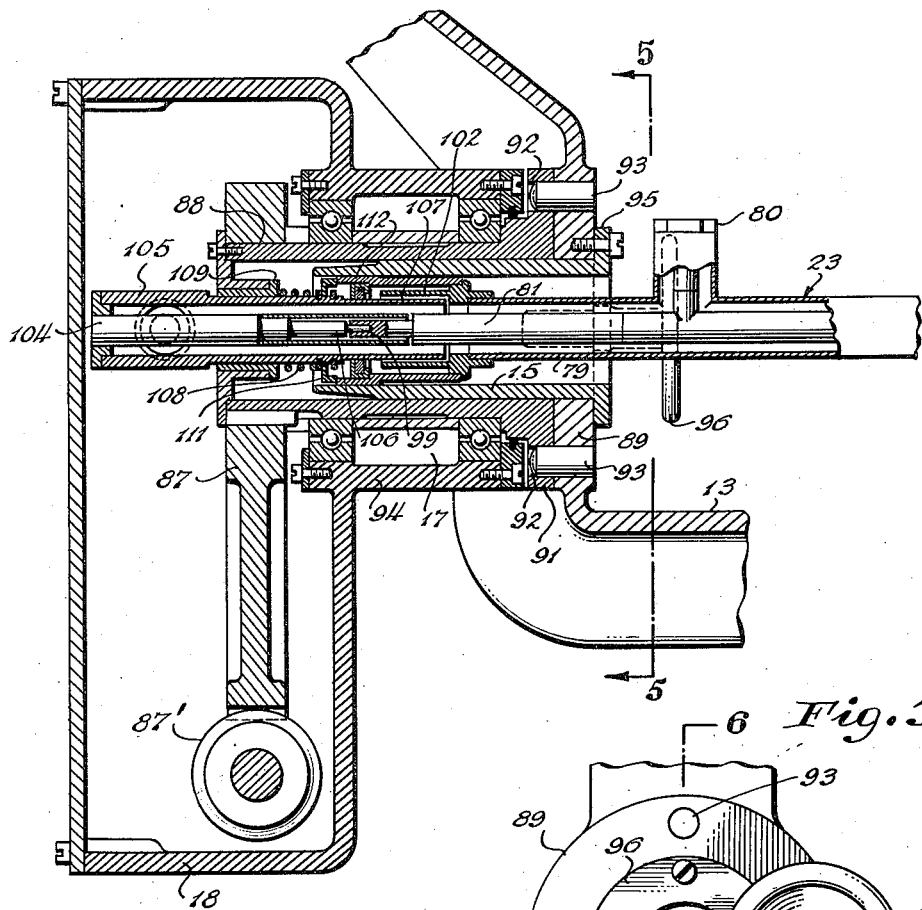
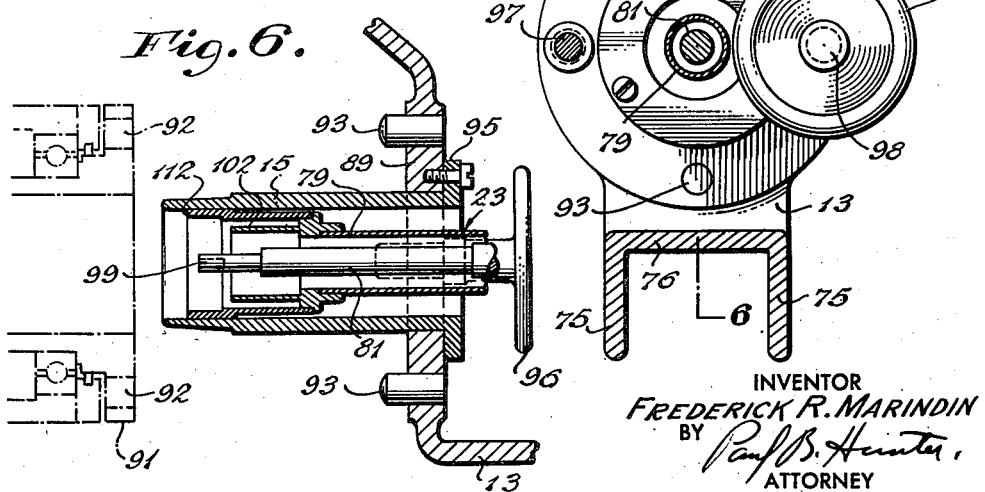

Patented Sept. 5, 1950

2,520,945

UNITED STATES PATENT OFFICE 2,520,945

WAVE TRANSMISSION APPARATUS

Frederick R. Marindin, Port Washington, N. Y., assignor to The Sperry Corporation, a corporation of Delaware Application August 18, 1943, Serial No. 499,081

12 Claims. (Cl. 250—33.65)

My invention relates to wave-projecting and receiving apparatus and concerns, particularly, rotatable transmission lines and scanner mountings.

It is an object of my invention to provide a concentric line for electromagnetic transmission in which a portion of the line may be rotatable.

A further object of the invention is to provide a rotatable antenna support.

Another object of the invention is to provide a transmission line with relatively movable parts, but which is well supported without the use of insulators.

A further object of the invention is to provide a compact, sturdy, rotatable-element transmission line which may be rotated by a standard type of motor, which may have standard bearings.

A further object of the invention is to provide a transmission line which has rotatable parts without causing line reflections.

Still another object of the invention is to provide a transmission line which may readily be pressurized although it has or supports moving parts.

Another object of the invention is to provide a quarter-wave stub type of support for a rotatable line.

Also another object of the invention is to provide a demountable scanner for electromagnetic propagation or reception in which electrical and mechanical connections may be broken simultaneously by a single operation.

Other and further objects and advantages will become apparent as the description proceeds.

Object-locating and tracking systems have been proposed in which a beam of ultra high frequency or microwave electromagnetic oscillations is projected in a direction toward an object to be detected or being tracked. Such a beam is caused to spin about an axis with which it makes a rather small angle so as to produce what is known as a conical scan. Variation in the strength of reflections resulting from departure of the object being tracked from the center of the cone described by the spinning beam are utilized to produce indications of such departure and to enable the object to be tracked. For enabling the beam-projecting apparatus to track such an object, the apparatus as a whole, or the portion thereof, projecting the beam, is also provided with a rocking motion.

For projecting microwave beams having oscillation frequencies of the order of 3,000 to 9,000 megacycles, for example, a radiator, in the form- ing of a parabolic reflector with a dipole antenna at the focal point thereof, is advantageously employed. For bringing the electromagnetic energy from an ultra high frequency generator to the antenna a concentric transmission line is employed.

Arrangements have been proposed in which the entire scanner, consisting of the parabola and the dipole antenna, is rotated about a spin axis to produce the conical scan. A tracking motion is obtained by providing means for rocking the rotating support of the scanner parabola.

In carrying out my invention in the preferred form, however, I utilize a scanner parabola which may be stationary while the conical scanning effect is being produced. In producing the conical scan the antenna alone is rotated; the wave generator and auxiliary equipment are kept stationary. This, however, necessitates a rotatable joint in the transmission line carrying electrical energy to the antenna. In accordance with my invention, therefore, I provide an improved type of transmission line link in which one end thereof may be rotatable and may support the rotating antenna, whereas, the other end is stationary, but makes effective, though not actual, electrical contact with the stationary portion. For permitting a rocking motion to enable a detected object to be tracked in elevation, the scanner parabola is mounted on a frame which is pivotally mounted to provide such rocking motion.

The scanner parabola is provided with a center column containing the transmission line for transmitting electrical energy from a point outside the parabola on its mechanical axis to the rotating antenna which is within the parabola. A second transmission line link is provided which has a physical axis coincident with the pivot axis of the parabola-carrying frame, and which makes a substantially right angle connection with the transmission line link mounted within the center column of the parabola.

The center column is constructed as an enclosing housing for the transmission line link within it so that only one packed joint is necessary in case the rotatable transmission line is to be pressurized.

The frame for the parabola is provided with journals or trunnions which may readily be removed from bearings carried on stationary supporting brackets to facilitate quick and easy demounting of the scanner parabola. One of the trunnions and its cooperating bearing includes a disconnectable microwave transmission line joint so that, when the apparatus is demounted, a single operation breaks the electrical and mechanical connections between the supporting frame for the parabola and the stationary apparatus on which it is mounted.

A better understanding of the invention will be afforded by the following detailed description considered in connection with the accompanying drawings, in which:

Fig. 1 is an elevation view, partially in cross-section and with certain parts broken away for clarity, of a scanner parabola and carrying frame therefor constituting one embodiment of my invention. In Fig. 1 the parabola is assumed to have been rocked to the position in which the conical or beam spin axis is vertical;

Fig. 2 is an elevation view corresponding to Fig. 1, but showing the manner in which the parabola and its rocking support frame are demounted from stationary bearings;

Fig. 3 is a detail sectional view, broken in part, illustrating the center column of the parabola with the rotatable transmission line, and antenna mounted therein;

Fig. 3A is a section on the line 3A—3A of Fig. 3, viewed in the direction of the arrows;

Fig. 4 is an enlargement of a part of Fig. 1, presenting a view, mainly in cross-section, of one of the parabola-carrying frame trunnions and supporting bearings showing the manner of rocking the apparatus, and showing the detachable electrical connections of the transmission line link, which lies along the axis of rotation of the scanner rocking frame;

Fig. 5 is a fragmentary detailed view, partially in cross-section, illustrating the portion of the apparatus of Fig. 4 as cut by a plane 5—5 and viewed by looking in the direction of the arrows shown in Fig. 4;

Fig. 6 is a fragmentary detailed view corresponding to Fig. 4, but with cooperating parts shown in separated positions to illustrate the manner of demounting the apparatus, and partially showing a cross-section of the apparatus cut by the plane 6—6 indicated in Fig. 5.

Like reference characters are utilized throughout the drawings to designate like parts.

As shown in Fig. 1 the illustrated embodiment of the invention comprises a reflector parabola 11 having a center column 12 secured therein, along the physical axis of the parabola, and having a supporting frame 13 which is mounted to permit a rocking motion for tracking a moving object in elevation. The frame 13 is provided with a pair of trunnions 14 and 15 which are rotatably supported in bearings 16 and 17, respectively, the bearings 16 and 17 being carried by stationary bearing brackets (not shown). The bearing 17 may be integral with a gear box 18.

The center column 12 includes a flared outer end 19 for enclosing a dipole antenna, not visible in Figs. 1 and 2. A transmission line link 21 (not visible in Figs. 1 and 2) is also contained within the center column 12. A motor 22 is provided at the base of the center column 12 for rotating the antenna and a rotatable portion of the aforesaid transmission line link. For bringing microwave energy into the center column 12 a horizontal transmission line link 23 is provided which has one end entering the center column 12 and the other end entering the trunnion 15. The gear-housing 18 may contain suitable gearing for rocking the frame 13 and also includes the termination of an electrical coaxial line for making connection with the coaxial line link 23.

Referring to Fig. 3 the apparatus within the center column 12 comprises wave energy utilization means such as a dipole antenna 24 having a pair of transverse quarter-wave bars 25 and 26. For rotatably supporting the antenna 24, the coaxial transmission line 21 is provided, which includes a broken center conductor 27 and a broken outer conductor 28. The terms "center conductor" and "outer conductor" are used in the electrical sense and each of these elements physically includes several mechanically separated parts. The center conductor 27 includes a stationary conducting sleeve 29 in the lower part of the center column 12, a rotatable rod or tube 30 in the upper portion of the center column 12 and a tapered connecting portion 31 secured to or integral with the lower end of the rotatable rod or tube 30.

The outer conductor 28 includes a rotatable tube 32 in the upper portion of the center column 12, a stationary transformer portion 33 electrically and mechanically secured to the lower portion of the center column 12, and the lower portion 35 of the center column 12, which serves as the lower stationary end of the outer conductor 28.

The center column 12 may actually be assembled from several separate portions such as the flaring antenna inclosure 19, slightly tapering upper housing 34 and the lower casting 35, having a flange 36 integral therewith which is secured to the parabola 11 in an opening 37 at the center thereof (Fig. 1).

Summarizing, the center conductor 27 of the rotatable joint transmission line 21 includes the rotatable rod 30, the tapered portion thereof 31, and a stationary sleeve 29. Likewise the outer conductor 28 includes a rotatable tube 32, the stationary lower end 35 of the center column 12 and a transformer member 33 which is also stationary.

In order to form a frictionless low impedance electrical connection or coupling between the rotating member 31 and the stationary member 29 of the center conductor 27, a so-called capacity or electrostatic joint is provided. This is formed by providing the members 31 and 29 with coaxial telescoping, but non-contacting portions such as a tubular upward extension 41 of the member 29 and a tubular downward extension 42 of the member 31, with one extending portion telescoping into the other. In this case the extension 42 is surrounded by the extension 41. A cylindrical spacing therebetween is provided sufficient to insure no possibility of mechanical contact. On the other hand the spacing between the members 41 and 42 is made small enough and their length is made great enough to provide a relatively large condenser surface which acts as a negligible impedance at the high frequencies involved and is therefore equivalent to an electrical connection between the members 31 and 29.

A similar capacity joint is provided between the rotary and stationary portions of the outer conductor 28, as illustrated. It may comprise an upper outward concentric extension 43 of the member 33, which is stationary and an inner downward extension 44 of the rotating tube 32.

The rod 30 forming a portion of the center conductor 27 is mechanically supported rotatably by means of a rotatable shaft 45. The shaft 45 is suitably supported as by means of one or more bearings 46 carried by the stationary center conductor sleeve 29, and may be provided with a pressure seal 47. If desired, the seal 47 may include metallic packing material or other means may be provided to maintain the lower end of the shaft 45 at the same electrical potential as the lower end 86 of the outer member 35. The shaft 45 is secured in a suitable manner as by means of an extension or coupling sleeve 48 to a drive shaft 49 which may be the shaft of the motor 22 (Figs. 1 and 2). The center rod or conductor 30 may actually be tubular in form and is secured to the shaft 45 by means of a reduced diameter upward-extending portion 51 of the shaft 45, which portion 51 is press-fitted into the expanding portion 31 of the tubular rod 30.

The center conductor rod 30 and the outer conductor cylinder 32, both of which are rotatable, may be secured to each other by any suitable means, as by means of an annular spacer 52 and a nut 53 threaded onto a threaded extension 54 of the rod 30, or a screw threaded onto the rod 30.

A disc reflector 55 for preventing direct radiation from the mouth of the parabola 11 may also be secured at the upper end of the transmission line by means of the nut and screw elements 53 and 54.

An opening 56 is provided at one side of the outer conductor cylinder 32 for the antenna bar 25, which is secured and electrically connected to the inner conductor or rod 30; and the other antenna bar 26 is electrically and mechanically connected to the outer cylinder 32. By suitably choosing the distance measured in electrical wavelengths from the antenna bars 25 and 26 to the connecting disc 52 at the upper end of the transmission line, it is unnecessary to insulate the members 30 and 32 from each other. It is to be understood that the distance is such that an odd number of quarter-wavelengths separate the antenna bars 25 and 26 from the connecting member 52.

For supporting the central and lower portions of the rotating parts of the outer conductor, bearings 57 and 58 are provided. The bearing 57 may comprise a suitable bearing sleeve or stationary bushing 59 mounted at the upper end of the portion 34 of the center column 12 and a journal surface outside the outer conductor cylinder 32. For providing a hardened journal surface and for also suitably modifying the electrical characteristics of the antenna 24 in relation to the transmission line, a cylindrical member 61 may be shrunk onto the portion of the cylinder conductor 32 which journals within the bearing sleeve 59. The upper portion 62 of the member 61 is flared or provided with an increased diameter cylindrical shape for producing the desired electrical and electrostatic effect on the bars 25 and 26.

The bearing 58 may be of the ball-bearing type, including an outer ball race 63 supported between the top of the member 35 and a shoulder 64, in the lower end of the member 34.

Cooperating with the outer ball race 63 there is an inner ball race 65 secured between two nuts 66 and 67 threaded onto the lower portion of the outer conductor cylinder 32. It is to be understood that the separable members 34 and 35 of the center column 12 may be secured in a suitable manner, as by means of a threaded joint 68.

The antenna-enclosing member 19 may be secured to the member 34 of the center column 12 by means of a suitable device such as a flanged nut 69.

For wholly enclosing the space surrounding the antenna 24, and the transmission line which supports it, a cap 71 may be threaded onto the antenna closing member 19.

It will be understood that the antenna enclosing elements 19 and 71 must be composed of a material which is not impervious to microwave radiation, but which is preferably impervious to weather, and so joined as to exclude both air and water. For example, the members 19 and 71 may be composed of a plastic transparent to microwaves, such as polymethyl methacrylate, sold under the trade names of "Lucite," "Pontalite" and "Plexiglas."

If the antenna 24 and the transmission line feeding it are to be pressurized, that is, subject to air above atmospheric pressure, or the enclosing space of the column 12 is to be filled with some inert gas, or evacuated, all of the joints mentioned will necessarily have to be gas tight. It will be observed that the only joint having moving parts is at the pressure seal 47 so that packing is required at only one point when the apparatus is to be pressurized. The stationary sleeve 29 forming the lower end of the inner conductor 27 is secured in any suitable manner, as by means of screws 70 and a flange construction to the lower portion of the member 35 of the center column 12. The joint will, of course, be made pressure-tight if the apparatus is to be pressurized.

To provide rigidity and to take weight off the parabola 11, which may be composed of relatively light sheet metal, the lower end of the member 35 of the center column 12 may be flared as at 72, and provided with a flange 73, which is secured by means of screws or bolts or the like, to a portion 74 of the frame 13 (Figs. 1 and 2). As shown in Fig. 5, the frame 13 may be cast or formed as a channel member, the U-shaped cross-section having rib portions 75 and a web portion 76.

For making connections at right angles between the transmission line link 23 and the rotatable transmission line center column 12, the lower stationary portion of the rotatable transmission line 21 consisting of the member 35 is suitably formed. Near the base of this member an annular transverse extension 77 is provided similar to the transversely extending portion of a T pipe fitting. The transmission line 23 is provided with an expanding right-hand end 78 fitting the T joint portion 77 at the base of the stationary outer conductor member 35 of the rotatable transmission line 21. The expanding member 78, it will be understood, is an electrical extension of the outer conductor 79 of the horizontal transmission line 23.

For forming an electrical connection between the inner conductor 81 of the horizontal transmission line link 23 and the inner conductor member 29 of the antenna-feeding transmission line 21, a member 82 is provided which is electrically connected to the inner conductor 81 of the horizontal transmission line 23 and is threaded into a T portion 83 formed in the stationary portion 29 of the inner conductor of the antenna-feeding transmission line. If desired, for the sake of facility in disassembling the apparatus, a pin and socket joint 84 may be provided between the inner conductor elements 81 and 82, and a suitably formed flange and clamp joint 85 may be provided for detachably joining the outer members 79 and 78.

As indicated in Figs. 1, 2 and 3, the transmission line 23 is provided with quarter wave stub supports 80 to obviate the necessity for insulating the inner and outer conductors from each other by means of insulating rings, beads or the like. In order to obtain the electrical equivalent of quarter wave stub support for my rotatable element transmission line I dimension the parts of the members at the lower end of the center column 12 so that the transversely extending T portion 83 of the stationary center conductor 29 will be a quarter wavelength distant from the lower flanged end 86 of the transmission line, making due allowance for end effects. The inner conductor member 29 and the outer conductor member 35 are therefore physically connected and are also actually electrically connected with regard to direct current, but are in effect insulated from each other with regard to ultra high frequency waves which are to be transmitted through the rotatable element transmission line 21 from the horizontal line 23 to the antenna 24. Thus, the rotatable transmission line is entirely free of insulating material and yet has a sturdy compact construction with relatively vibration-free support for the rotary and stationary elements thereof.

As shown in greater detail in Fig. 4, the parabola-carrying frame 13 is secured to a worm gear 87 within the gear box 18 for rocking the parabola by means of a worm 87' meshing with the gear 87 and driven by means (not shown) for enabling an object to be tracked in elevation. The worm gear 87 is splined to a sleeve member 88 which is adapted to be secured to a faced portion 89 of the parabola-carrying frame 13. For detachably securing the sleeve member 88 to the faced portion 89 of the frame 13, the member 88 is provided with a flange 91 having a pair of openings 92 adapted to receive locating pins 93 which are permanently secured by a press-fit or otherwise in the faced portion 89 of the frame 13. These elements are shown in somewhat greater clarity in Fig. 6 where the demountable portion of the apparatus has been shown as moved to the right from the stationary portion of the apparatus, which is secured to the gear box 18 and the stationary supporting members (not shown).

The rotatable sleeve member 88 is suitably journalled by means of a ball-bearing or the like in a projecting portion 94 of the gear box 18. Other mechanical features of the gear box and the bearing will be apparent and need not be described in further detail. However, the apparatus secured to the frame 13 and cooperating with the rotatable sleeve 88 will be further described to illustrate the manner in which simultaneous electrical and mechanical detachability are provided for mounting or demounting the parabola frame 13 in the bearings 16 and 17. Secured to the faced portion 89 of the parabola frame 13 is the trunnion or plug member 15 having a flange 95 screwed or otherwise secured to the right-hand surface of the faced portion 89 of the parabola frame 13. The member 15 is arranged to make a slide fit within the rotatable sleeve 88 which is secured to the worm wheel 87.

For detachably securing the parabola frame 13 with its trunnions 14 and 15 within the bearings 16 and 17 (Figs. 1 and 2) a pair of screw wheels 96 is provided, one of which is visible in Figs. 4 and 5 and the other of which has been omitted for clarity in the drawing. Referring to Fig. 5 a pair of threaded studs 97 and 98 is secured in the faced portion 89 of the parabola frame 13, for example, at points 90 degrees from the locating pins 93. When the parabola 11 is mounted in place with the trunnions 14 and 15 mounted in the bearings 16 and 17 the faced portion 89 of the frame 13 is secured to the drive sleeve 88 by means of the wheel nuts 96 (only one of which is shown), which are threaded over the studs 97 and 98.

For enabling the electrical connection and disconnection to be performed simultaneously with the mechanical mounting and demounting, the left-hand end of the horizontal transmission line link 23 which extends through the plug member or trunnion 15, as shown most clearly in Fig. 6, is provided with a pin-receiving socket 99 in the inner conductor 81 and an outer concentric tubular extension 102 for the outer conductor 79. Referring to Fig. 4 a stationary transmission line including inner and outer conductors 104 and 105 is provided which terminates in the gear box 18 and receives energy from a continuation of this transmission line extending into the stationary portion of the apparatus (not shown herein). The inner conductor 104 ends in a pin 106 cooperating with the pin-socket 99, and the outer conductor 105 terminates in an inner cylindrical extension 107 which cooperates with the extension 102 of the conductor 79 of the transmission line 23 to form a non-contacting electrostatic joint of the character already described.

Referring to Fig. 4, if desired a retaining spring 108 may be provided, which bears against a flange 109, and a second flange 111 may be secured to the right-hand end of the outer conductor 105, which is provided with slight axial movability within the flange member 109. A sleeve 112, surrounding the leftward extension 102 of the outer conductor 79 of the horizontal transmission line 23, and secured thereto, may be provided for abutting the flange 111. In this manner when the frame 13 is mounted with the trunnion 15, in the bearing 17, carried by the gear box 18, the outer conductor 79 of the transmission line 23, carried by the frame 13, is allowed to seat itself against the transmission line members 104 and 105 by a slight yieldability of the latter.

It will be understood that the transmission line including the conductors 104 and 105 supplies energy from an ultra high frequency generator (not shown) through the transmission line links to the antenna 24 to be radiated by the antenna, and that it also receive energy supplied thereto by the antenna 24 and the transmission line links when such energy is reflected from a detected object or an object being tracked. Suitable transmission-reception boxes, for separating transmitted and received energy and other requisite control apparatus, are mounted in the stationary portion of the apparatus (not shown) and it is thus unnecessary to mount these parts, some of which are delicate and other rather bulky, in the rotatable mechanism carrying the antenna 24, or even in the mechanism rocking with the parabola 11.

The possibility of mounting such other apparatus apart from the parabola and the spinning antenna 24 makes apparent the advantage of utilizing the demountable construction shown, and the construction providing for relative rotation of separate portions of the transmission line link 21, one of which may carry the rotating antenna.

Although for convenience I have referred to certain parts (not shown) as stationary and have referred to stationary bearing brackets (not shown) for supporting the bearings 16 and 17 and the gear box 18, it will be understood that in fact such bearing brackets may be stationary only with respect to the parabola 11, as such bearing brackets may be secured to a turntable for enabling the apparatus to track objects in azimuth. I have therefore used the expression "stationary" in the relative sense in the specification.

The construction as thus far described would not indicate the production of a conical scan. The energy radiated by the antenna 24 would follow a line making an angle with the physical axis of the parabola 11 if the center column 12 were eccentrically mounted, or if the antenna 25 were eccentric. However, it is not necessary to mount the center column 12 eccentrically, and for high speeds of rotation it is ordinarily undesirable to make the antenna bars 25 and 26 eccentric. The requisite slight deflection of the angle of the radiated and received beam from the physical axis 113 of the parabola 11, may, however, be accomplished electrically instead of mechanically, for instance, by so shaping the flange member 62 or some other field-distorting member as to cause the effect of the rotating antenna 24 to be slightly eccentric with respect to the nonrotating electrical parts.

The conical scanning of the applicant may be caused by any electrical asymmetry of the dipole antenna relative to the parabolic reflector. This may be caused by an asymmetry in flange 62. However, it is not necessary to have additional mechanical structure to produce this asymmetry, as there is an electric unbalance caused by the mounting of the dipole on the coaxial line; for instance, referring to Figs. 3 and 3A it will be seen that the longest electromagnetic lines of force (not shown) will extend from one end of portion 25 of the dipole to the other end of portion 26, 25 being connected to the inner conductor 27 of the coaxial line and 26 to the outer conductor 32. Shorter lines of force will extend from portion 25 to the outer conductor 32, and there will also be electromagnetic lines fringing portion 25 from the inner conductor to the outer conductor about the opening in the outer conductor 32. Thus it will be seen that there is an unbalanced configuration of electromagnetic lines due to the unbalance relationship of the dipole to the coaxial line, and this electrical asymmetry is sufficient to displace the beam and thereby cause conical scanning as the antenna is rotated.

In accordance with the provisions of the patent statutes I have described the principle of operation of my invention together with the apparatus which I now believe to represent the best embodiment thereof, but I desire to have it understood that the apparatus shown and described is only illustrative and that my invention may be carried out by other arrangements.

What is claimed is:

1. A wave projection apparatus comprising a curved reflector, a separately spinnable dynamically balanced dipole antenna mounted thereto with electrical asymmetry, a center column having a flared outer end secured therein along the physical axis thereof and containing said antenna for producing a conical beam of electromagnetic energy, and rockable means supporting said reflector.

2. A microwave antenna system comprising a curved reflector; a coaxial line along the axis of said curved reflector having broken inner and outer conductors, said inner conductor comprising a stationary conducting sleeve, and a rotatable tube having a tapered connecting portion with a collar extension secured to said tube; and a dipole antenna having electrical asymmetry to said reflector rotatably supported by said rotatable tube whereby said antenna may be dynamically balanced and spun to obtain a conical directivity characteristic.

3. A microwave radiator system comprising a curved reflector; a coaxial line along the axis of said curved reflector having broken inner and outer conductors, said outer conductor comprising a rotatable tube and a stationary transformer portion having a collar extension; and a dipole antenna having electrical asymmetry to said reflector rotatably supported by said coaxial line whereby said antenna may be dynamically balanced and spun to obtain a conical directivity characteristic.

4. A microwave radiator comprising a curved reflector; a coaxial line along the axis of said curved reflector having broken inner and outer conductors, said inner conductor comprising a stationary conducting sleeve, a rotatable tube and a tapered connecting portion with a collar extension secured to said tube, said outer conductor comprising a rotatable tube and a stationary tranformer portion; and a dipole antenna having electrical asymmetry to said reflector rotatably supported by said coaxial line whereby said antenna may be dynamically balanced and spun to obtain conical directivity characteristics.

5. A wave projection apparatus comprising a concave reflector, a separately spinnable mechanically balanced antenna mounted thereon with electrical asymmetry for producing a conical beam of electromagnetic energy, demountable means supporting said antenna, means supplying electromagnetic energy to said antenna, and coaxial transmission line links connecting said means with said antenna, one of said links including relatively rotatable elements, one element of which is secured to the antenna.

6. A wave projection apparatus comprising a concave reflector, a readily separately spinnable mechanically balanced antenna mounted thereon with electrical asymmetry for producing a conical beam of electromagnetic energy, demountable means supporting said antenna, means connected with said supporting means to nod said reflector for tracking a moving object in elevation, means for supplying electromagnetic energy to the antenna, said means being substantially at right angles to said antenna.

7. A wave projection apparatus comprising a concave reflector, a dynamically balanced spinnable antenna mounted thereon with electrical asymmetry for producing a conical beam of electromagnetic energy, means supporting said reflector, means connected with said supporting means to nod said reflector for tracking a moving object, means for supplying electromagnetic energy to said antenna comprising a coaxial transmission line having a portion external to said reflector and a housing containing said transmission line, whereby said transmission line is enabled to be pressurized.

8. A wave projection apparatus comprising a curved reflector, a dynamically balanced spinnable antenna mounted thereon with electrical asymmetry for producing a conical beam of electromagnetic energy, means supporting said reflector, a gear housing including gears connected with said supporting means to nod said reflector for tracking a moving object, means for supplying electromagnetic energy to said antenna in cooperation with said support, a coaxial transmission line having a portion external to said reflector connecting said means with said antenna, and a housing containing said transmission line whereby said transmission line is enabled to be pressurized.

9. A wave projection apparatus comprising a curved reflector, a dynamically balanced spinnable antenna mounted thereon with electrical asymmetry, a center column secured therein along the physical axis thereof and containing said antenna for producing a conical beam of electromagnetic energy, means supporting said reflector, means connected with said supporting means to nod said reflector for tracking a moving object, means supplying electromagnetic energy to said antenna in cooperation with said support, a coaxial transmission line having a portion external to said reflector connecting said means with said antenna, and a housing containing said transmission line whereby said transmission line is enabled to be pressurized.

10. A wave projecting apparatus comprising a stationary concave reflector, a mechanically balanced spinnable antenna having an electrical asymmetry to said reflector for producing a conical scan, means for supplying electromagnetic energy to said antenna and a rotatable coaxial transmission line joint connecting said supplying means with said antenna.

11. A high speed, dynamically balanced microwave, conical scan antenna system comprising a reflector, a dipole antenna located near the focus of said reflector and mounted on a rotatable coaxial line having inner and outer conductors, a rotating joint connected to said coaxial line, a stationary coaxial line connected to the other end of said rotating joint than said rotatable coaxial line and having an outer conductor and a hollow inner conductor, and a drive shaft extending through the hollow inner conductor of the stationary coaxial line and mechanically connected to the inner conductor of the rotatable coaxial line whereby the rotatable line and the antenna are adapted to be driven at high speed.

12. A high speed, dynamically balanced microwave conical scan antenna system comprising a reflector, a dipole antenna located near the focus of said reflector and mounted on a rotatable coaxial line having inner and outer conductors, a rotating joint connected to said coaxial line, a stationary coaxial line connected to the other end of said rotating joint than said rotatable coaxial line and having an outer conductor and a hollow inner conductor, an electrically shielded ball bearing ring interposed between said rotatable outer conductor and said stationary outer conductor, and a drive shaft extending through the hollow inner conductor of the stationary coaxial line and mechanically connected to the inner conductor of the rotatable coaxial line whereby the rotatable line and the antenna are adapted to be rotated at high speed, with a minimum of mechanical vibration.

FREDERICK R. MARINDIN.

REFERENCES CITED

The following references are of record in the file of this patent:

UNITED STATES PATENTS

| Number | Name | Date |
|---|---|---|
| 1,828,705 | Kolster | Oct. 20, 1931 |
| 1,835,031 | Espenschied | Dec. 8, 1931 |
| 1,934,078 | Ludenia | Nov. 7, 1933 |
| 2,038,240 | Schelkunoff | Apr. 21, 1936 |
| 2,052,317 | Schelkunoff | Aug. 25, 1936 |
| 2,054,896 | Dallenbach | Sept. 22, 1936 |
| 2,082,347 | Leib et al. | June 1, 1937 |
| 2,083,242 | Runze | June 8, 1937 |
| 2,108,867 | Mathieu | Feb. 22, 1938 |
| 2,189,284 | Fritz | Feb. 6, 1940 |
| 2,207,690 | Cork et al. | July 9, 1940 |
| 2,231,929 | Lyman | Feb. 18, 1941 |
| 2,275,646 | Peterson | Mar. 10, 1942 |
| 2,308,521 | Lear | Jan. 19, 1943 |
| 2,332,529 | Reppert | Oct. 26, 1943 |
| 2,351,895 | Allerding | June 20, 1944 |
| 2,370,053 | Lindenblad | Feb. 20, 1945 |
| 2,401,344 | Espley | June 4, 1946 |
| 2,407,305 | Langstroth | Sept. 10, 1946 |
| 2,413,187 | McCurdy et al. | Dec. 24, 1946 |
| 2,415,103 | Langstroth | Feb. 4, 1947 |
| 2,426,226 | Labin et al | Aug. 26, 1947 |
| 2,429,640 | Miehler et al. | Oct. 28, 1947 |
| 2,434,509 | Okress | Jan. 13, 1948 |
| 2,446,436 | Rouault | Aug. 3, 1948 |

FOREIGN PATENTS

| Number | Country | Date |
|---|---|---|
| 450,484 | Great Britain | July 20, 1936 |